United States Patent Office 2,844,582
Patented July 22, 1958

2,844,582
HETEROCYCLIC ARYL PHOSPHORUS ESTERS

Charles F. Raley, Jr., San Antonio, Tex., assignor to the United States of America as represented by the Secretary of the Air Force No Drawing. Application July 17, 1956
Serial No. 598,487

4 Claims. (Cl. 260—289)

This invention relates to heterocyclic aryl phosphorus esters and particularly to heterocyclic aryl phosphates.

As the operating temperatures of lubricants in jet engines approach 400° F., the antioxidants which stabilize the currently used diester-type fluids become unstable themselves. Above 400° F. there are few, if any effective compounds.

It is an object of this invention to provide novel compounds which are heterocyclic aryl phosphorus esters usable as antioxidants for high-temperature lubricants.

It is another object of the invention to provide heterocyclic aryl phosphates which are particularly useful as high-temperature antioxidants for diester-type fluids currently used as jet engine lubricants.

These and other objects of the invention will become apparent as the detailed description of the invention proceeds.

The invention is new compositions of matter in the form of heterocyclic aryl phosphorus esters and the use of these compounds as antioxidants for high-temperature lubricants. Particularly desirable compounds of this type are the heterocyclic aryl phosphates having the general formula

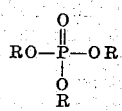

wherein at least one of the R-groups is heterocyclic and the other R-groups are aryl.

The hetero-atom can be nitrogen, oxygen or sulfur, or other atom capable of being incorporated in a ring and of being oxidized. A number of examples of suitable heterocyclic groups for the heterocyclic aryl phosphates are: furyl, pyrryl, thienyl, pyridyl, thiazolyl, isoxazolyl, pyrazolyl, imidazolyl, 1,2,3-triazolyl, 1,2,4-triazolyl, benzofuryl, dibenzofuryl, indolyl, quinolyl, pyrimidyl, pyrazinyl, quinazolyl, quinoxalyl, acridyl, etc. If more than one heterocyclic group is contained in a molecule, the groups can be the same or different heterocyclic groups. A number of heterocyclic groups suitable for the new compounds of the invention are mentioned above. These groups are meant only to be illustrative of suitable groups and not limiting since obviously other groups of similar nature would be suitable. Although substituted heterocyclic groups could be used, e. g., alkylheterocyclic groups, the same arguments against using such substituted groups apply as discussed below with relation to aryl groups.

The aryl groups of the heterocyclic aryl phosphates can be groups such as: phenyl, indenyl, naphthyl, diphenyl, fluorenyl, phenanthrylene, anthralene, etc.

As in the case of the heterocyclic groups, these aryl groups are mentioned only as being illustrative of suitable groups for use in the compounds of the invention and are not meant to be limiting since obviously many other groups of similar nature would be suitable. The aryl groups can be substituted aryl, for example, alkyl-aryl, or other nonreactive substituents can be added to the aryl groups; however, there is no particular reason for using substituted aryl groups and, in fact, the high-temperature stability of the compounds might be reduced, by using substituted aryl groups. The unsubstituted aryl groups listed above and like groups are the preferred ones to use in the compounds of the invention. Obviously, the aryl groups, if there is more than one in a molecule, can be the same or different aryl groups.

A few examples will be given below of the preparation of heterocyclic aryl phosphates.

EXAMPLE I

*Diphenyl 8-quinolyl phosphate.*—(a) As a first step in the manufacture of the desired final compound diphenyl phosphoryl chloride is synthesized. A typical preparation is described. In a 2-l. flask equipped with a reflux condenser and thermowell were placed 612 gm. (4 moles) of $POCl_3$ and 752 gm. (8 moles) of phenol. The temperature was brought to 200° C. as rapidly as possible and was held there for four hours. (Using a 2-l. Glas-Col heating mantle, 70 v. was applied, then reduced to 45 v. when 200° C. was reached.) After two distillations, the diphenyl phosphoryl chloride was obtained. This was a water-white, refractive liquid, B. P. 172°/5 mm.; the weight was 533.6 gm., or 49.5% of theory.

(b) To a solution of 145 gm. (1 mole) of 8-hydroxyquinoline in one pound of pyridine was added 268.5 gm. (1 mole) of diphenyl phosphoryl chloride. Some heat was liberated so the temperature was reduced by cooling the reaction vessel with tap water. After standing for about 36 hours, crystals had formed. The reaction mixture was diluted with 5 pounds of $CCl_4$, then washed in turn with 1 liter quantities of water, 5% KOH, water, 3% HCl, and water. After drying the solutions over anhydrous $MgSO_4$, the volatile materials were removed by distillation up to a flask temperature of 154° C. at atmospheric pressures, then up to 199° C. at 32 mm. Four vacuum distillations gave 209 gm. of diphenyl 8-quinolyl phosphate, B. P. 211°–218°/0.12 mm., $n_D^{35.5}$ 1.6040, $d_4^{25}$ 1.2801, equivalent to a yield of 58.0%. The product was a lemon-yellow oil which crystallized on standing to a solid melting at 58–59° C. Exposure to air appeared to cause slow darkening.

EXAMPLE II

*Diphenyl 3-pyridyl phosphate.*—To a solution of 95.1 gm. (1 mole) of 3-pyridol dissolved in one pound of pyridine was added 268.5 gm. (1 mole) of diphenyl phosphoryl chloride. After standing for 15 hours, the reaction mixture was diluted with 5 pounds of $CCl_4$ and washed with 1 liter quantities of water, 5% KOH, 3% HCl, and water. After drying over anhydrous $MgSO_4$, the $CCl_4$ and other volatile materials were removed by heating at atmospheric pressure and under aspirator vacuum to a flask temperature of 150° C. Two subsequent distillations gave 194.3 gm. of diphenyl 3-pyridyl phosphate, a fairly mobile liquid, B. P. 183–185° C./0.10 mm., $n_D^{22}$ 1.5672. Upon prolonged refrigeration, the liquid crystallized to a solid, M. P. 33° C. The pour point of the liquid was −30° F. The yield was 56.6%. Molecular weight 331 (obsd.); 328 (calc.).

EXAMPLE III

*Bis-(1-naphthyl) 3-pyridyl phosphate.*—To 184.3 gm. (0.5 mole) of dinaphthyl phosphoryl chloride dissolved in one-half pound of pyridine was added 47.5 (0.5 mole) of 3-hydroxypyridine. The dinaphthyl phosphoryl chloride can be made in a manner similar to that used to make the diphenyl phosphoryl chloride of Example I, substituting 1-naphthol for phenol in equivalent molar quantities. After standing for about 36 hours, the reaction mixture was diluted with 5 pounds of $CCl_4$ and washed with 1 liter portions of water, 5% KOH, and water. After stripping off volatiles by heating to 150° C. under aspirator vacuum, the reaction product was vacuum-distilled. The product was a very viscous orange diquid $n_D^{27}$ 1.6372, B. P. 243–248° C./0.11 mm. The molecular weight was 432 (obsd.); 427 (calc.).

In Table I shown below, additional physical properties of the compounds of Examples II and III are set forth.

Table I

| Physical Property | Diphenyl 3-Pyridyl Phosphate | Bis-(1-Naphthyl) 3-Pyridyl Phosphate |
|---|---|---|
| Calc. NBP,[1] °C. (°F.) | 404 (759) | 510 (950) |
| Thermal Decomp. Temp., °C. (°F.) | 362 (684) | 298 (568) |
| Viscosity, cs.: | | |
| 100° F | 18.9 | |
| 210° F | 3.38 | 17.9 |
| 400° F | 0.93 | 2.01 |
| ASTM Slope: | | |
| 100°–210° F | [2] 0.838 | |
| 210°–240° F | 0.890 | 0.881 |
| Pour Point, °F | | 55 |

[1] Normal boiling point.
[2] Viscosity at 20° F., 449 cs. Slope 20°–100° F., 0.927.

The approximate thermal decomposition temperatures of the functional groups of the examples are indicated in Table II below.

Table II

| Group: | Temperature, | |
|---|---|---|
| | °C. | (°F.) |
| Phenyl | >485 | (905) |
| 1-naphthyl | 475 | (890) |
| 3-pyridyl | 300–360 | (570–685) |
| 8-quinolyl | 330 | (625) |

To test antioxidant properties in a qualitative manner, several tests were made on the compound diphenyl 3-pyridyl phosphate. In the first test a 150 cc. beaker containing 50 gm. of tris-(o-chlorophenyl) phosphate+0.5 gm. diphenyl 3-pyridyl phosphate was heated at an average temperature of about 550° F. on a hot plate. The control was a 50 gm. sample of tris-(o-chlorophenyl) phosphate with no additive. The test was interrupted after 95 minutes at which time the test sample was light yellow and clear with no sludge deposition. The control was cloudy but colorless and had also deposited no sludge. The test was resumed after an interval of 15½ hours and upon reaching 550° F., the test sample deposited considerable sludge and had become cloudy and colorless. The control was cloudy and colorless. It was thought that moisture pickup occurred during the interval. The weight loss of the test sample after 345 minutes was 72.7% while the weight loss of the control was 86.3%. The conclusion is drawn that the additive was effective as an inhibitor until the test was interrupted and even so, there was less weight loss of the test sample overall.

A second test was run in two parts. In the first part, 7 cc. of tris (m-chlorophenyl) phosphate was placed in a 20 cc. beaker. Test temperature was approximately 500° F. The compound turned dark in less than one-half hour and deposited sludge. After about four hours, the sample had completely evaporated. Sludge was deposited on the sides and bottom of the beaker.

In the second part of the second test, a 7 cc. sample of tris-(n-chlorophenyl) phosphate+0.2 cc. of diphenyl 3-pyridyl phosphate was placed in a 20 cc. beaker. The temperature was about 500° F. After two hours the sample was light yellow, slightly hazy, and had deposited a thin layer of sludge on the bottom of the beaker but none on the sides. The color then darkened slowly and the sludge deposition increased with time until at six hours the beaker was dry, with a black varnish deposit. The conclusion is drawn that the additive showed definite antioxidant properties, since darkening and volatilization of the sample was very much slower and sludge deposition much less.

Additional oxidation test data using the same inhibitor with a different synthetic lubricant oil is shown in Table III below. The synthetic lubricant used in this case is di-(2-ethylhexyl) sebacate which is marketed commercially under the trade name of "Plexol 201." Briefly, the test consisted of an oxidation period followed by physical measurements on the oxidized medium. The test cells were prepared from 50/50 T-joints sealed 12 cm. below the end of the standard taper joint. One hundred ml. of the synthetic lubricant was placed in each test cell, and the additive was placed in one of the test cells. The cells were placed in a multiple unit, aluminum block thermostatically controlled which held the temperature within two degrees at 400° F. An air inlet tube of 1.6 mm. orifice passed through a 500 mm. condenser, fitted to the top of the test cell, was continued to within ¼ inch of the bottom of the test cell. After preliminary heating, or warm-up period, usually of one hour duration, clean dry air was passed through the tube into the liquid and vented through the condenser for the duration of the evaluation period at a rate of 5±0.5 liters per hour, unless otherwise specified. The temperature of the tests was 240° C. (465° F.).

Table III

| Additive | Weight Percent Additive | Time, Hours | Viscosity Change, Percent, at 54.4° C. (130° F.) | Neut. No. |
|---|---|---|---|---|
| None | 0.0 | 0 | 0.0 | 0.6 |
| | | 8 | 5.8 | 6.8 |
| | | 17 | 17.0 | 13.5 |
| | | 24 | 27.1 | 17.3 |
| Diphenyl 3-Pyridyl Phosphate | 1.1 | 0 | 0.0 | 0.6 |
| | | 8 | 11.3 | 10.6 |
| | | 16 | 15.9 | 14.9 |
| | | 24 | 18.1 | 17.2 |

These antioxidants would also be good antioxidants for other high-temperature lubricants such as: Di-$C_8$-oxo-adipate, dihexyl azelate, dioctyl azelate, dibutyl dimerate, dipropylene glycol dipelargonate, bis-(2-ethylhexyl)2-ethylhexyl phosphonate, dihexyl hexane phosphonate, di-octyl sebacate, and similar synthetic lubricant fluids.

Closely related to the heterocyclic aryl phosphates described above are the heterocyclic aryl thiophosphates which are represented by the general formula:

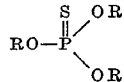

These thiophosphates as in the case of the phosphates would be good high-tempermature antioxidants. The R-groups are defined for the thiophosphates represented by formula above exactly the same as for the phosphates which are described in detail above.

Heterocyclic aryl phosphates have been described in detail above. Also the making and testing of some of these compounds as antioxidants has been described. There are a number of related compounds, falling under the same broad class of compounds, namely, the heterocyclic aryl phosphorus esters, which are new compounds and like the phosphates are useful as high-temperature antioxidants. The following description of these related compounds is not meant to be a complete listing but rather illustrative. The heterocyclic and aryl groups in these compounds are defined exactly as described above with relation to the phosphates. These related compounds are:

Heterocyclic aryl phosphites

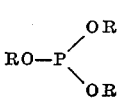

Heterocyclic aryl phosphonates

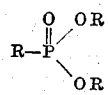

Heterocyclic aryl pyrophosphates

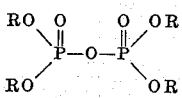

Heterocyclic aryl bis-phosphates

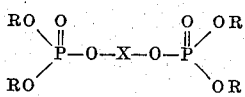

In each of the four classes of related compounds described above at least one of the R-groups is a heterocyclic group and the other R-groups are aryl groups. X is a bifunctional arylene group. Some other high-temperature antioxidants are the heterocyclic aryl thiophosphonates, heterocyclic aryl pyrophosphonates, heterocyclic aryl bis-phosphonates, etc., and the limited definitions applying to the compounds shown immediately above by formula apply also to these compounds. Obviously, the groups of compounds listed are merely indicative of suitable high-temperature antioxidants and are not meant to be a complete listing of all the related types.

Although the invention has been described in terms of specified embodiments which are set forth in considerable detail, it should be understood that this is by way of illustration only and that the invention is not necessarily limited thereto, since alternative embodiments will become apparent to those skilled in the art in view of the disclosure. Accordingly, modifications are contemplated which can be made without departing from the spirit of the described invention or of the scope of the appended claims.

What I claim is:

1. A compound selected from the group consisting of diphenyl 3-pyridyl phosphate, diphenyl 8-quinolyl phosphate, and dinaphthyl 3-pyridyl phosphate.
2. Diphenyl 3-pyridyl phosphate.
3. Diphenyl 8-quinolyl phosphate.
4. Dinaphthyl 3-pyridyl phosphate.

References Cited in the file of this patent

UNITED STATES PATENTS

| | | |
|---|---|---|
| 2,686,783 | Morrison | Aug. 17, 1954 |
| 2,769,013 | Lowenstern Lom | Oct. 30, 1956 |

OTHER REFERENCES

Kosolopoff: Organophosphorus Compounds (N. Y.), John Wiley and Sons Inc., 1950, pages 266 and 262.

Viscontini et al.: Hevl. Chim. Acta, vol. 34, pages 2438–9 (1951).